United States Patent [19]

Kato et al.

[11] Patent Number: 4,882,604
[45] Date of Patent: Nov. 21, 1989

[54] ELECTRONIC MACHINE HAVING TIME MEASURING FUNCTION

[75] Inventors: Akio Kato; Hiroaki Hamano; Hideo Ito, all of Azuchi, Japan

[73] Assignee: Minolta Camera Kabushiki Kaisha, Osaka, Japan

[21] Appl. No.: 230,886

[22] Filed: Aug. 11, 1988

[30] Foreign Application Priority Data

Aug. 12, 1987 [JP] Japan .................................. 62-202194

[51] Int. Cl.⁴ ............................................ G03G 15/00
[52] U.S. Cl. .................................... 355/201; 355/202; 368/10; 368/327
[58] Field of Search ................. 355/201, 202; 368/1, 368/8, 9, 10, 11, 184, 278, 327

[56] References Cited

U.S. PATENT DOCUMENTS

| | | | |
|---|---|---|---|
| T 102,102 | 8/1982 | Bolle et al. | 355/201 X |
| 3,997,873 | 12/1976 | Thornton | 355/201 X |
| 4,394,087 | 7/1983 | Irie et al. | 355/204 |
| 4,408,899 | 10/1983 | Flaig | 368/9 X |
| 4,453,074 | 6/1984 | Weinstein | 235/380 |
| 4,455,080 | 6/1984 | Sugiura et al. | 355/201 |
| 4,455,093 | 6/1984 | Bowen et al. | 368/10 |
| 4,501,485 | 2/1985 | Tsudaka | 355/201 |
| 4,531,826 | 6/1985 | Stoughton et al. | 355/201 |
| 4,534,012 | 8/1985 | Yokozana | 368/10 X |
| 4,543,643 | 9/1985 | Shibazaki et al. | 364/900 |
| 4,615,609 | 10/1986 | Honma | 355/201 |
| 4,633,405 | 12/1985 | Ito et al. | 355/218 |
| 4,739,377 | 4/1988 | Allen | 355/201 X |
| 4,740,810 | 4/1988 | Ito | 355/56 |
| 4,769,765 | 9/1988 | Green | 368/10 X |
| 4,779,120 | 10/1988 | Haas | 368/327 X |

Primary Examiner—A. C. Prescott
Attorney, Agent, or Firm—Burns, Doane, Swecker & Mathis

[57] ABSTRACT

An electronic machine and a timepiece for removably mounting in the machine as an auxiliary device. The timepiece supplies current time information to the machine, and the machine includes a device for inputting desired time information. A control system is provided in the machine for stopping or starting an operation of the machine when the current time information agrees with the desired time information.

15 Claims, 6 Drawing Sheets

ELECTRONIC MACHINE HAVING TIME MEASURING FUNCTION

BACKGROUND OF THE INVENTION

The present invention relates to time control of electronic machinery and implements for industrial and household use, for automatically switching on or off a copying machine, for example, at a selected time.

The copying machine is a typical example of machinery for which such automatic time control may be executed. Conventionally, a copying machine contains a timepiece in its main body, wherein a time selected by operating numeric keys or other input means and time information provided by the timepiece are compared, and the power source is automatically turned on and off in response to results of the comparison.

The timepiece is contained in the machine body as noted above. Therefore, when the machine is shipped to regions varying in the standard time, the timepiece must be set to the standard time of each region for which the machine is intended. This results in the inconvenience of increased variations in the specification of the same product. Consequently, the known device has the problem of complicating the manufacturing process and distribution of the machine.

SUMMARY OF THE INVENTION

Having regard to the state of the art as noted above, an object of the present invention is to provide an electronic machine and a timepiece for effecting time control of the machine, without complicating the manufacturing process and distribution thereof.

The above object is fulfilled, according to the present invention, by an electronic machine having a main body and an auxiliary device removably attachable to the main body, the machine comprising timepiece means disposed in the auxiliary device and including a timer for supplying current time information to the main body when mounted in the main body, and control means for controlling the main body in response to the current time information.

When the auxiliary device or timepiece is mounted in the main body of the electronic machine to be controlled, the machine receives a time signal from the timepiece for comparison with a selected time input through numeric keys or the like. Results of the comparison form basis for time control of the machine.

Consequently, it is no longer necessary for the machine to contain a timepiece as a permanent part for time controlling the machine. Even when the machine is intended for regions varying in the standard time, the machine per se may be manufactured without necessitating the initial setting step required in the prior art, and may be distributed with entirely the same specification.

The feature of involving no additional variation relating to the time control is particularly advantageous in relation to office machinery such as the copying machine which is becoming increasingly diversified in specification to amplify its functions.

Thus, according to a further aspect of the invention, there is provided a copying machine comprising a main body; power feed means; timer means for starting or stopping the power feed means at a selected time; and input means including a numeric input device, a magnification varying device for identifying a numerical value input or displayed by the numeric input device as a copying magnification to be input, and a time varying device for identifying the numerical value input or displayed by the numeric input device as time information to be input.

It will be appreciated that the time control function is an important aspect of electronic machinery of this type.

BRIEF DESCRIPTION OF THE DRAWINGS

The above and other objects or features of the present invention will become apparent from the following description of a preferred embodiment thereof taken in conjunction with the accompanying drawings, in which:

FIG. 1-a is a schematic view of an auxiliary device according to the present invention, FIG. 1-b is a schematic perspective view of a copying machine which is one example of electronic machine according to the present invention.

DETAILED DESCRIPTION OF THE PREFERRED EMBODIMENT

Figure 1A:
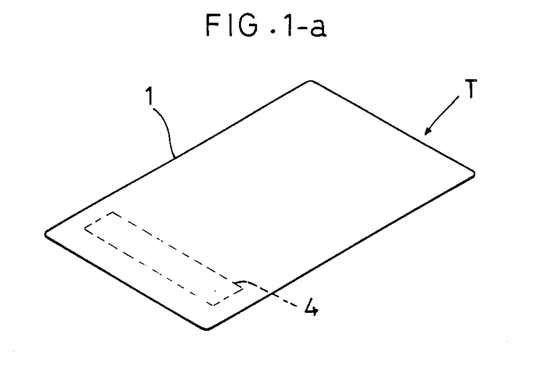
Figure 1B:
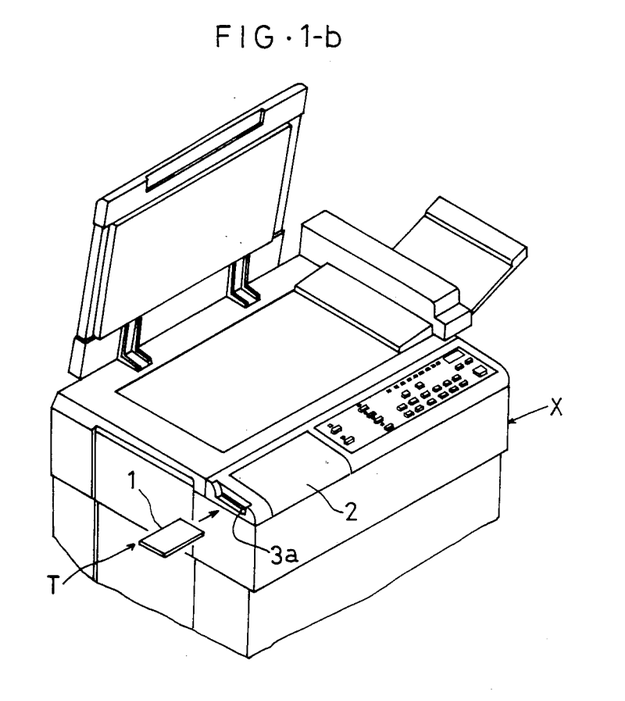

An embodiment of the present invention will be described hereinafter with reference to the drawings, in which the electronic machine comprises a copying machine and the auxiliary device a timepiece. As shown in FIGS. 1-a and 1-b, the timepiece T is in the form of a plastic IC card whose body 1 contains an integrated circuit including a timer, for automatically switching on and off a power source of the copying machine X.

As shown in FIGS. 1-b and 3-a through 3-c, the card body 1 of the timepiece T is inserted through a card inlet 3a defined laterally of a control panel 2 of the copying machine X and is mounted in a card holder 3 provided in the copying machine X. The card body 1 carries an interface terminal 4 for outputting a time signal of the internal timer to the copying machine X when mounted in the card holder 3.

Figure 3A:
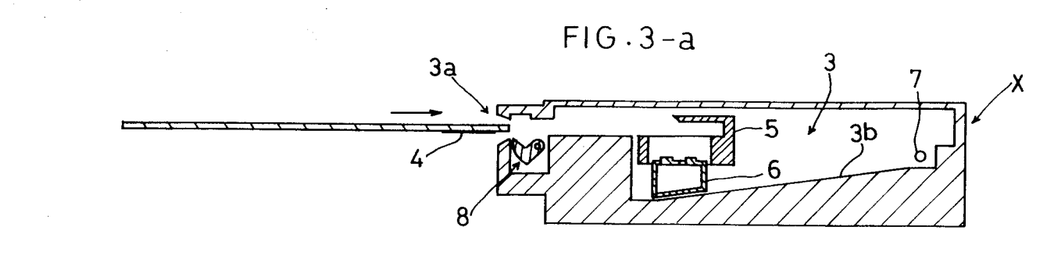
Figure 3B:
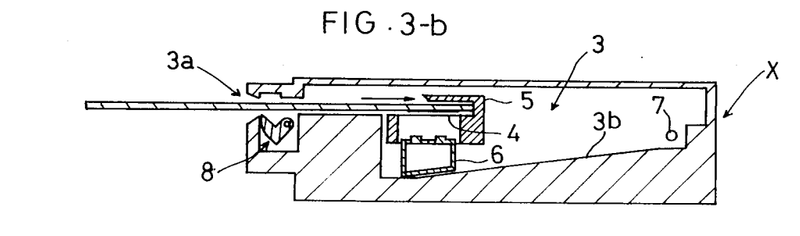
Figure 3C:
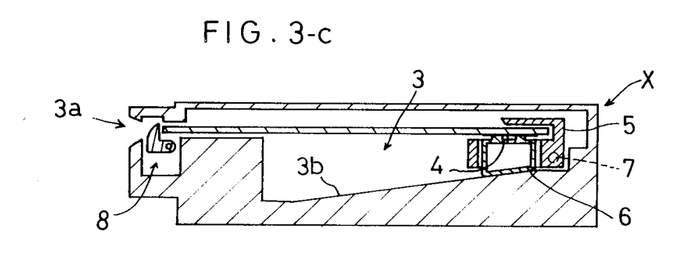

As shown in FIGS. 3-a through 3-c, the card holder 3 includes a guide member 5 for receiving a leading end of the inserted card body 1 and moving with the card body 1, and a signal receiving contact 6 attached to the guide member 5 to be movable in a direction perpendicular to a direction of insertion of the card body 1. As the card body 1 advances into the card holder 3, the contact 6 moves toward the card body 1 by contact with a cam surface 3b defined in the bottom of the card holder 3. The contact 6 is in contact with the interface terminal 4 when the card body 1 is fully inserted as shown in FIG. 3-c. The card holder 3 further includes a card end sensor 7 for detecting completion of the card insertion through presence of the guide member 5, and a lock mechanism 8 for engaging a rear end of the card body 1 in the fully inserted position to retain the card body 1 in position and for releasing the card body 1 when an eject button (not shown) on the control panel 2 is pressed.

Figure 2:
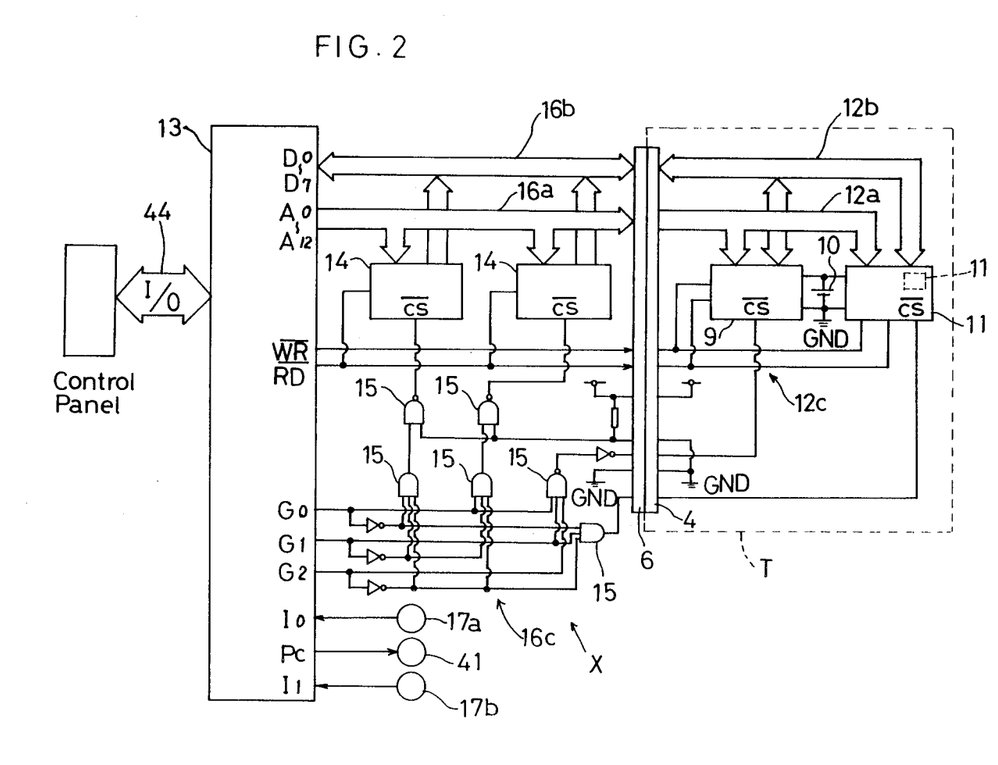
FIG. 2 is a diagram showing an electric connection between the copying machine and the auxiliary device, FIGS. 3-a through 3-c are sectional views of a holder section showing how the auxiliary device is mounted in the copying machine.

FIG. 2 shows an electric connection between the copying machine X according to the present invention and the timepiece T acting as the auxiliary device. In the drawing, the portion enclosed by the broken line T corresponds to the timepiece T, and the other portions belong to the copying machine X. As seen, the timepiece T contains a RAM 9, a backup battery 10, and an integrated circuit 11 including a timer 11a. These components are connected to the interface terminal 4 through an address bus 12a, a data bus 12b and other signal lines 12c.

The interior of the copying machine connected through the contact 6 to the interface terminal 4 of the timepiece T includes a CPU 13 acting as a control device, two ROMs 14 and several gate elements 15. These components are connected to the contact 6 through an address bus 16a, a data bus 16b and other signal lines 16c.

The CPU 13 includes the following input and output ports. Input ports D0-D7 are for receiving data. Output ports A0-A12 are for outputting addresses. Two output ports $\overline{WR}$ and $\overline{RD}$ are for selectively outputting high-lever strobe pulses depending on whether data are read from the two ROMs 14 of the copying machine X and the RAM 9 of the timepiece T or data are written into the RAM 9 of the timepiece T. Three output ports G0-G2 are for outputting gate opening and closing signals to open and close the gate elements 15 for selectively making access to the RAM 9, ROMs 14 and integrated circuit 11. Output port PC is for outputting a power source control signal for switching the power source of the copying machine X on and off. Two input ports I0 and I1 are for receiving signals from door switches 17a and 17b which are operable by opening and closing of a pair of front doors of the copying machine X.

Further, the CPU 13 receives copying condition setting and other signals through an I/O bus 44 from various keys on the control panel 2.

Figure 4:
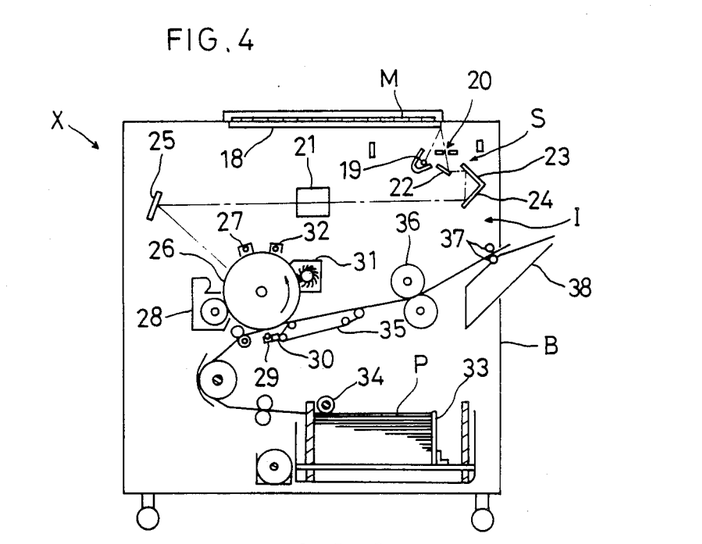
FIG. 4 is a schematic view showing the construction of the copying machine.

FIG. 4 is a schematic sectional view of the copying machine, in which an original document M placed on a document table 18 comprising a glass plate is illuminated by an exposure lamp 19. The light reflected by the document M passes through a slit 20 and is projected onto a photoreceptor drum 26 by an image forming optical system I comprising an image forming lens 21 and a plurality of mirrors 22-25.

The exposure lamp 19, slit 20 and first mirror 22 constituting a scanning device S are driven by a DC motor (not shown) to move leftward in the drawing at a speed v for scanning the document M. The second mirror 23 and third mirror 24 are driven by the same DC motor to move leftward at half the speed (v/2) of the scanning device S in order to maintain an image forming optical path provided by the image forming optical system I at a constant length.

The light from the document M scanned by the scanning device S is projected onto the photoreceptor drum 26 driven by a different motor (not shown) to rotate counterclockwise in the drawing at a constant speed, whereby an electrostatic latent image corresponding to the document image is formed on the drum 26.

The photoreceptor drum 26 is surrounded by a charger 27 for uniformly charging the drum surface, a developer 28 for developing the electrostatic latent image by applying a toner to the latent image, a transfer device 29 for transferring the toner image to recording paper P, a separating device 30 for separating the recording paper P from the drum 26 after the toner image transfer, a cleaning device 31 for removing superfluous toner remaining on the drum surface after the toner image transfer, and a main eraser lamp 32 for erasing the electric charger from the drum surface after the toner image transfer.

The recording paper P is stored on a paper supply tray 33. The paper P is picked up one sheet after another by a pickup roller 34 in response to a recording signal, to be fed to the transfer device 29.

The recording paper P, separated from the photoreceptor drum 26 by the separating device 30 with the toner image transferred thereto from the drum 26 by the transfer device 29, is transported by a conveyor belt 35 to a fixing device 36 for thermally fusing the toner forming the image and fixing it to the recording paper P. Thereafter the recording paper P is discharged by a discharge roller pair 37 onto a tray 38 outwardly of a main body B of the copying machine.

Figure 5:
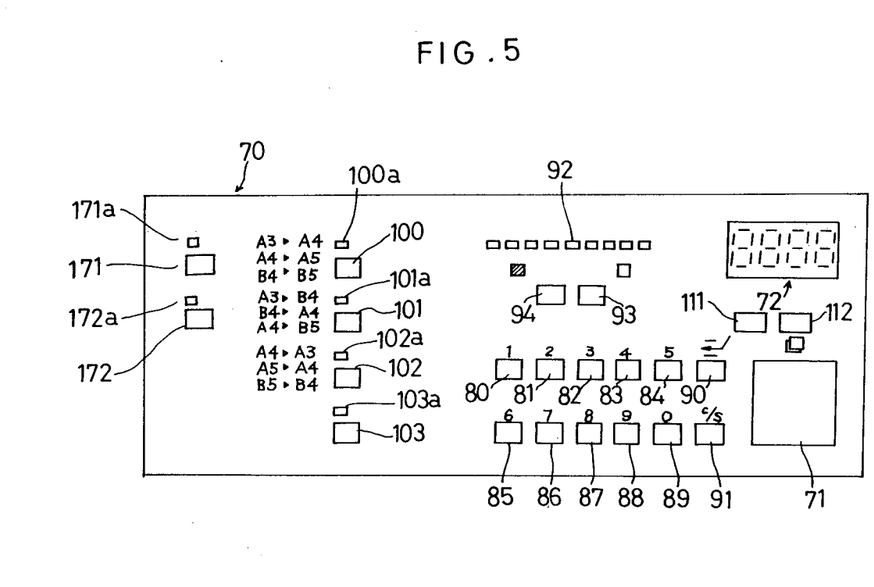
FIG. 5 is a view showing details of a control panel.

How the control panel of this embodiment functions will be described next with reference to FIG. 5.

The keys on the control panel are operable to control the number of copies to be taken and to select copying magnification which are the intrinsic functions of the copying machine. In addition, it is possible to carry out, through the control panel, input of a selected time and setting of a current time which constitute the time control functions contemplated by the present invention.

Specifically, the control panel includes the following keys and indicators: a print key 71 for starting a copying operation, a digital display 72 for displaying the number of copies, copying magnification and the time, keys 80-89 for inputting numerical values, an interrupt key 90 for interrupting a copying operation, a clear/stop key 91 for effecting a clearing or stopping operation, a lamp 92 for indicating an amount of exposure, a key 93 for increasing the amount of exposure, a key 94 for decreasing the amount of exposure, keys 100-103 for selecting copying magnification, a key 111 for increasing the numerical value, a key 112 for decreasing the numerical value, a key 171 for selecting a time writing mode, a key 172 for selecting a current time setting mode, and lamps referenced with the small letter "a" for indicating ON/OFF states of the associated keys.

In a normal operation, the copying magnification select keys 100-103 and the time-related keys 171 and 172 are turned off, and the number of copies is controlled by inputting a numerical value through the input keys 80-89 and numerical value increase and decrease keys 111 and 112, with the input value displayed on the digital display 72. When the print key 71 is pressed in this state, a selected number of copies are taken.

A copying magnification is selected by operating one of the copying magnification select keys 100-103. Then the selected copying magnification is displayed on the digital display 72. The magnification displayed is also variable by operating the increase and decrease keys 111 and 112.

The time control according to the present invention will be described next. A mode change is effected by pressing the key 171 for selecting the time write mode. Then a selected time is input by operating the numeric keys 80-89 and increase and decrease keys 111 and 112, whereby the time is displayed on the digital display 72. The time on the digital display 72 may be changed as desired, and thereafter the key 171 is pressed again to complete and exit from the time write mode, setting the time to the value on the display 72.

When the key 172 is pressed, a current time may be set in the same manner as described above by operating the numeric keys 80–89 and increase and decrease keys 111 and 112. This time setting or adjusting operation is completed by pressing the key 172 again.

While the increase and decrease keys 111 and 112 are operable to vary the value input to the digital display 72, a different mode may be selected in which these two keys are adapted for varying the input vale at high and low speeds. As another mode, these keys may correspond to the hour and minute in the time setting. Further, these keys may be used for inputting values in addition to one of the above three functions.

Figure 6:
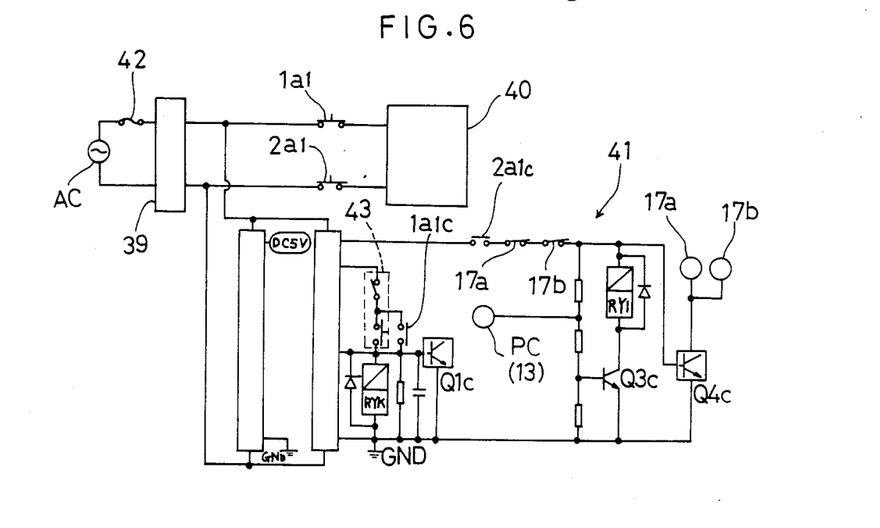
FIG. 6 is a block diagram of a power source circuit of the copying machine.

FIG. 6 shows part of a power source circuit of the copying machine X. A source voltage from an alternating current source AC is decreased by a transformer 39 and distributed to a driver 40 for driving the charger 27 and various motors and clutches and to a controller 41 for controlling electrification of the driver 40.

A fuse 42 is mounted between the alternating current source AC and transformer 39, and a pair of contacts 1a1 and 2a1 are mounted between the transformer 39 and driver 40 for interrupting power supply to the driver 40 in response to a control signal from the controller 41. The controller 41 includes a main switch 43 disposed in the main body of the copying machine X, and the front door switches 17a and 17b mentioned hereinbefore.

When the main switch 43 is closed, a current flows to a relay RY1c whereby a pair of contacts 1a1c and 2a1c become conductive. The relay RY1c assumes a self-holding state when the main switch 43 and contact 1a1c become conductive.

When the front door switches 17a and 17b are closed with the main switch 43 also closed, the base voltage of a transistor Q3c becomes high level and the transistor Q3c becomes conductive whereby a current flows to a main relay RY1. As a result, the contacts 1a1 and 2a1 become conductive and power is supplied to the driver 40.

The controller 41 receives the power source control signal from the output port PC of CPU 13. When the copying machine X is switched off regardless of the state of the main switch 43, the source control signal becomes low level. As a result, the base voltage of transistor Q3c becomes low level to render the transistor Q3c nonconductive thereby to break the current flow to the main relay RY1. Then the contacts 1a1 and 2a1 become nonconductive to stop the power supply to the driver 40.

When the copying machine X is switched on again, the source control signal becomes high level. As a result, a current flows to the main relay RY1 again and the contacts 1a1 anad 2a1 become conductive to resume the power supply to the driver 40.

The RAM 9 of timepiece T stores desired time information for automatically switching the copying machine X on and off. This time information, for example, is for switching the copying machine on at commencement of work in the morning, off at the beginning of noon recess, on at commencement of work in the afternoon, and off at the closing hour.

The CPU 13 which is the control unit in the copying machine X reads the desired time information from the RAM 9 of timepiece T and current time information from the timer 11a included in the integrated circuit 11 of timepiece T. The CPU 13 compares the two pieces of time information, and automatically switches the copying machine X on and off by changing the source control signal to high level and low level in response to results of the comparison.

The above-mentioned desired time information is written into the RAM 9 of timepiece T by the CPU 13 in response to a key operation of the control panel 2 carried out after the timepiece T is mounted in the copying machine X. Alternatively, the timepiece T may be set to a separate card writing device for writing the desired time information.

As described above, the card body 1 of the timepiece T for mounting in the copying machine X contains the timer 11a, and the time control operation is effected on the copying machine X in response to the time signal generated by the timer 11a and output from the timepiece T. The specification of the copying machine X need not be changed at all for shipment to any region of different standard time by providing the timepiece T set to that standard time. This allows for smooth distribution as well.

Figure 7:
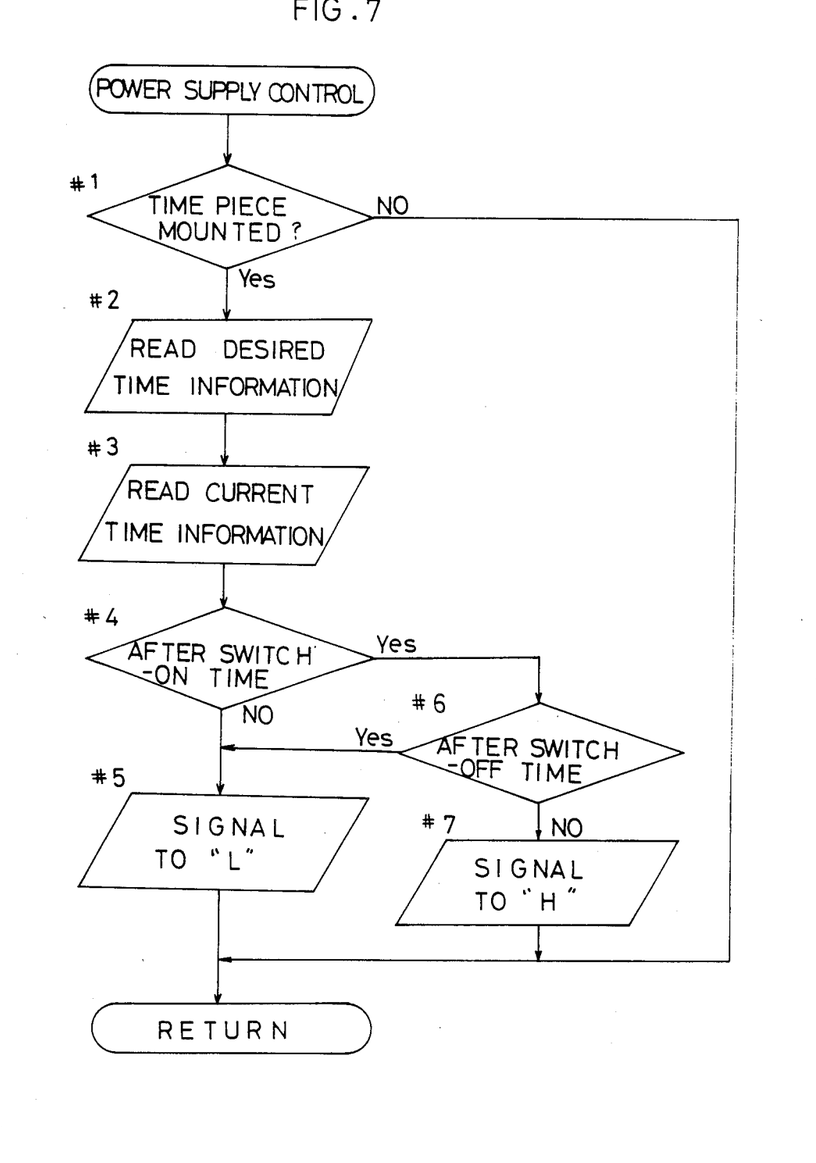
FIG. 7 is a flow chart for illustrating a power source control operation.

FIG. 7 is a flow chart of a control routine for automatically switching the copying operation X on and off.

When the control routine starts, step S1 judges from the output signal of the card end sensor 7 whether the timepiece T is mounted in the card holder 3 or not. If the timepiece T is not mounted, the program just returns to a main routine. If the timepiece T is mounted, the program moves to step S2 for reading the desired time information from the RAM 9 of timepiece T, to step S3 for reading the current time information from the integrated circuit 11 of timepiece T, and to step S4 for judging whether the current time is after a switch-on time or not. In this embodiment, the desired time information is provided one for the switch-on time and one for a switch-off time. However, the desired time information may be set for a plurality of each.

If step S4 judges that the current time is not the switch-on time yet, the source control signal is placed in low level at step S5 and the program returns to the main routine. If the current time is after the switch-on time, the program moves to step S6 for judging whether the current time is after the switch-off time or not. If step S6 judges that the current time is not the switch-off time yet, the source control signal is placed in high level at step S7 and the program returns to the main routine. If the current time is after the switch-off time, the program moves to step S5 for placing the source control signal in low level and returns to the main routine.

In the described embodiment, the timepiece T includes the RAM 9 for storing various desired time information. In an alternative arrangement, the control unit of the copying machine X may have a memory function with the RAM 9 omitted from the timepiece T. In this case, only the current time information is read from the timepiece T for comparison with the desired time information stored in the control unit of the copying machine X. The power source and other controls are effected on the basis of comparison results.

Further, the timepiece T is in the form of an IC card in the described embodiment. This timepiece T may be provided with a function to control use of the copying machine X. For example, identification codes of individual users or departments may be stored in such a timepiece T, and the total number of copies taken by each individual or department may be recorded for each time period on the basis of the identification code and the time signal output from the timepiece T.

The timepiece T may also be used for recording other relative time control data of the copying machine X by the control unit, such as actual working time of the copying machine X, paper feed time, and lamp operating time.

The timepiece T according to the present invention is applicable as time measuring means for effecting time control of other industrial machinery and household implements than the copying machine X as described hereinbefore.

The timepiece T may comprise the cartridge or cassette type instead of being in the form of an IC card. The interface terminal 4 acting as a connection may also take various other forms. For example, a cable or the like may be provided for electrically connecting the machine X to be controlled anad the connection 4 of timepiece T mounted in the card holder 3 of the machine X.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electronic machine having a main body and an auxiliary device removably attachable to the main body, comprising:
    timepiece means disposed in said auxiliary device and including a timer for supplying current time information to said main body when mounted in said main body; and
    control means for controlling said main body in response to said current time information.

2. An electronic machine as claimed in claim 1, wherein said main body includes power feed means and a power switch for switching said power feed means on and off, said control means being operable to switch said power feed means on and off in response to said current time information.

3. An electronic machine having a main body and an auxiliary device removably attachable to the main body, comprising:
    timepiece means disposed in said auxiliary device for supplying current time information;
    time information input means provided on said main body for inputting desired time information; and
    control means for stopping or starting an operation of said main body when said current time information agrees with said desired time information.

4. An electronic machine as claimed in claim 3, wherein said auxiliary device includes memory means for storing additionally input desired time information.

5. An electronic machine having a main body and an auxiliary device removably attachable to the main body, comprising:
    power feed means mounted in said main body;
    a power switch for switching said power feed means on and off;
    timer means disposed in said auxiliary device for supplying current time information;
    memory means disposed in said auxiliary device for storing desired time information; and
    control means for switching said power feed means on or off regardless of a state of said power switch when said auxiliary device is mounted in said main body and said current time information agrees with said desired time information.

6. A card device removably attachable to an electronic machine, comprising:
    timer means for producing current time information; and
    connector means for electrically connecting said card device to said electronic device when said card device is mounted in said electronic device, for allowing said current time information to be supplied to said electronic machine.

7. A copying machine comprising:
    a main body;
    power feed means;
    timer means for starting or stopping said power feed means at a selected time; and
    input means including a numeric input device, a magnification varying device for identifying a numerical value input or displayed by said numeric input device as a copying magnification to be input, and a time varying device for identifying the numerical value input or displayed by said numeric input device as time information to be input.

8. A copying machine as claimed in claim 7, wherein said timer means includes a current time information supply unit, a desired time information storing unit, and a control unit for comparing current time information and desired time information and for starting or stopping said power feed means when said current time information agrees with said desired time information.

9. A copying machine as claimed in claim 8, wherein at least said current time information supply unit is removably attached to said main body.

10. A copying machine as claimed in claim 7 wherein said time varying device is switchable between a first mode for setting current time information and a second mode for setting desired time information, and has a function to set the time information numerically input by the numeric input device as information corresponding to selected one of the first and second modes, said function being performed by selecting between a current time setting mode key and a time writing mode key.

11. A copying machine as claimed in claim 7, wherein said numeric input device includes up and down keys for inputting numerical values.

12. A copying machine as claimed in claim 11, wherein said time varying device puts a value of time information forward in response to an operation of one of said up and down keys and backward in response to an operation of the other of said up and down keys.

13. A copying machine as claimed in claim 11, wherein said time varying device puts a value of time information fast forward in response to an operation of one of said up and down keys and slowly forward in response to an operation of the other of said up and down keys.

14. A copying machine as claimed in claim 11, wherein said time varyng device puts the "hour" of time information forward in response to an operation of one of said up and down keys and the "minute" of the time information forward in response to an operation of the other of said up and down keys.

15. A copying machine as claimed in claim 11, wherein said time varying device is selectively operable in a first mode for putting a value of time information forward in response to an operation of one of said up and down keys and backward in response to an operation of the other of said up and down keys, a second mode for putting the "hour" of time information forward in response to the operation of one of said up and down keys and the "minute" of the time information forward in response to the operation of the other of said up and down keys, and a third mode for putting the value of time information fast forward in response to the operation of one of said up and down keys and slowly forward in response to the operation of the other of said up and down keys.

* * * * *